United States Patent
McCarthy, Jr. et al.

(10) Patent No.: US 7,610,751 B2
(45) Date of Patent: Nov. 3, 2009

(54) FUEL INJECTION BEFORE TURBOCHARGER

(75) Inventors: James Edward McCarthy, Jr., Canton, MI (US); Dmitry Arie Shamis, Commerce Township, MI (US); David Mark Ginter, Northville, MI (US)

(73) Assignee: Eaton Corporation, Cleveland, OH (US)

( * ) Notice: Subject to any disclaimer, the term of this patent is extended or adjusted under 35 U.S.C. 154(b) by 230 days.

(21) Appl. No.: 11/490,910

(22) Filed: Jul. 21, 2006

(65) Prior Publication Data

US 2008/0016849 A1 Jan. 24, 2008

(51) Int. Cl.
*F01N 3/00* (2006.01)
(52) U.S. Cl. .............................. 60/286; 60/280; 60/295; 60/297; 60/301; 60/303; 48/197 R; 48/198.3
(58) Field of Classification Search .................... 60/274, 60/280, 286, 295, 297, 303, 311; 48/197 R, 48/198.1, 198.3
See application file for complete search history.

(56) References Cited

U.S. PATENT DOCUMENTS

| | | | |
|---|---|---|---|
| 6,006,515 A | 12/1999 | Wakamoto | |
| 6,732,507 B1 | 5/2004 | Stanglmaier et al. | |
| 6,758,036 B1 | 7/2004 | Molinier | |
| 6,763,799 B2 * | 7/2004 | Ito et al. | 123/299 |
| 6,955,042 B1 * | 10/2005 | Wnuck et al. | 60/286 |
| 7,040,084 B2 * | 5/2006 | Ament | 60/274 |
| 7,082,753 B2 * | 8/2006 | Dalla Betta et al. | 60/286 |
| 7,101,531 B2 * | 9/2006 | Kamijo | 423/650 |
| 7,204,082 B1 * | 4/2007 | MacBain et al. | 60/286 |
| 7,347,043 B2 * | 3/2008 | Tahara et al. | 60/297 |
| 2001/0052232 A1 | 12/2001 | Hoffmann et al. | |
| 2003/0113249 A1 | 6/2003 | Hepburn et al. | |
| 2003/0140622 A1 | 7/2003 | Taylor, III et al. | |
| 2004/0040287 A1 | 3/2004 | Beutel et al. | |
| 2004/0050037 A1 | 3/2004 | Betta et al. | |
| 2004/0076565 A1 | 4/2004 | Gandhi et al. | |
| 2004/0112042 A1 | 6/2004 | Hoffmann et al. | |
| 2004/0116276 A1 | 6/2004 | Yezerets et al. | |
| 2006/0101810 A1 * | 5/2006 | Angelo et al. | 60/286 |

FOREIGN PATENT DOCUMENTS

| | | | | | |
|---|---|---|---|---|---|
| JP | 02005127260 A | * | 5/2005 | | 60/280 |
| WO | WO 2004/061278 A1 | | 7/2004 | | |
| WO | WO 2004/090296 A1 | | 10/2004 | | |
| WO | WO2007077817 A1 | * | 7/2007 | | 60/286 |

* cited by examiner

*Primary Examiner*—Binh Q Tran
(74) *Attorney, Agent, or Firm*—Paul V. Keller

(57) ABSTRACT

One concept relates to power generation system, comprising a diesel engine, an exhaust manifold, a turbocharger, and an exhaust line in which are configured a fuel reformer and a LNT. A fuel injector is configured to inject fuel into the manifold upstream of the turbine. The high temperatures upstream of the turbine cause the fuel to crack into smaller molecules, releasing heat and providing a boost to the turbocharger. The fuel injected into the manifold also undergoes intense mixing as it passes through the turbocharger. Injecting fuel in this manner provides several benefits for reformer operation. Another concept relates to a manifold fuel injector used to provide fuel for heating a DPF.

3 Claims, 7 Drawing Sheets

FUEL INJECTION BEFORE TURBOCHARGER

FIELD OF THE INVENTION

The present invention relates to pollution control devices for diesel engines.

BACKGROUND $NO_x$ and particulate matter (soot) emissions from diesel engines are an environmental problem. Several countries, including the United States, have long had regulations pending that will limit $NO_x$, and particulate matter (soot) emissions from trucks and other diesel-powered vehicles. Manufacturers and researchers have put considerable effort toward meeting those regulations. Diesel particulate filters (DPFs) have been proposed for controlling particulate matter emissions. A number of different solutions have been proposed for controlling NOx emissions.

In gasoline powered vehicles that use stoichiometric fuel-air mixtures, $NO_x$ emissions can be controlled using three-way catalysts. In diesel-powered vehicles, which use compression ignition, the exhaust is generally too oxygen-rich for three-way catalysts to be effective.

One set of approaches for controlling NOx emissions from diesel-powered vehicles involves limiting the creation of pollutants. Techniques such as exhaust gas recirculation and partially homogenizing fuel-air mixtures are helpful in reducing NOx emissions, but these techniques alone are not sufficient. Another set of approaches involves removing NOx from the vehicle exhaust. These approaches include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an adsorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

To clarify the state of a sometime ambiguous nomenclature, it should be noted that in the exhaust aftertreatment art, the terms "SCR catalyst" and "lean NOx catalyst" are occasionally used interchangeably. Where the term "SCR" is used to refer just to ammonia-SCR, as it often is, SCR is a special case of lean NOx catalysis. Commonly when both types of catalysts are discussed in one reference, SCR is used with reference to ammonia-SCR and lean NOx catalysis is used with reference to SCR with reductants other than ammonia, such as SCR with hydrocarbons.

LNTs are devices that adsorb NOx under lean exhaust conditions and reduce and release the adsorbed NOx under rich exhaust conditions. A LNT generally includes a NOx adsorbent and a catalyst. The adsorbent is typically an alkaline earth compound, such as $BaCO_3$ and the catalyst is typically a combination of precious metals, such as Pt and Rh. In lean exhaust, the catalyst speeds oxidizing reactions that lead to NOx adsorption. In a reducing environment, the catalyst activates reactions by which adsorbed NOx is reduced and desorbed. In a typical operating protocol, a reducing environment will be created within the exhaust from time-to-time to remove accumulated NOx and thereby regenerate (denitrate) the LNT.

Creating a reducing environment for LNT regeneration involves eliminating most of the oxygen from the exhaust and providing a reducing agent. Except where the engine can be run stoichiometric or rich, a portion of the reductant reacts within the exhaust to consume oxygen. The amount of oxygen to be removed by reaction with reductant can be reduced in various ways. If the engine is equipped with an intake air throttle, the throttle can be used. However, at least in the case of a diesel engine, it is generally necessary to eliminate some of the oxygen in the exhaust by combustion or reforming reactions with reductant that is injected into the exhaust.

The reactions between reductant and oxygen can take place in the LNT, but it is generally preferred for the reactions to occur in a catalyst upstream of the LNT, whereby the heat of reaction does not cause large temperature increases within the LNT at every regeneration.

Reductant can be injected into the exhaust by the engine fuel injectors or separate injection devices. For example, the engine can inject extra fuel into the exhaust within one or more cylinders prior to expelling the exhaust. Alternatively, or in addition, reductant can be injected into the exhaust downstream of the engine.

U.S. Pat. Pub. No. 2004/0050037 (hereinafter "the '037 publication") describes an exhaust treatment system with a fuel reformer placed in the exhaust line upstream of a LNT. The reformer includes both oxidation and reforming catalysts. The reformer both removes excess oxygen and converts the diesel fuel reductant into more reactive reformate.

The operation of an inline reformer can be modeled in terms of the following three reactions:

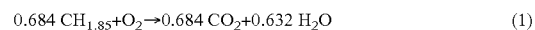

$$0.684\ CH_{1.85} + O_2 \rightarrow 0.684\ CO_2 + 0.632\ H_2O \quad (1)$$

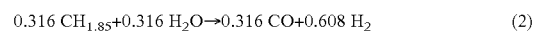

$$0.316\ CH_{1.85} + 0.316\ H_2O \rightarrow 0.316\ CO + 0.608\ H_2 \quad (2)$$

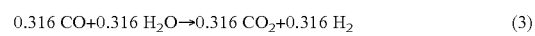

$$0.316\ CO + 0.316\ H_2O \rightarrow 0.316\ CO_2 + 0.316\ H_2 \quad (3)$$

wherein $CH_{1.85}$ represents an exemplary reductant, such as diesel fuel, with a 1.85 ratio between carbon and hydrogen. Reaction (1) is exothermic complete combustion by which oxygen is consumed. Reaction (2) is endothermic steam reforming. Reaction (3) is the water gas shift reaction, which is comparatively thermal neutral and is not of great importance in the present disclosure, as both CO and $H_2$ are effective for regeneration.

The inline reformer of the '037 publication is designed to be rapidly heated and to then catalyze steam reforming. Temperatures from about 500 to about 700° C. are said to be required for effective reformate production by this reformer. These temperatures are substantially higher than typical diesel exhaust temperatures. The reformer is heated by injecting fuel at a rate that leaves the exhaust lean, whereby Reaction (1) takes place. After warm up, the fuel injection rate is increased to provide a rich exhaust. Depending on such factors as the exhaust oxygen concentration, the fuel injection rate, and the exhaust temperature, the reformer tends to either heat or cool as reformate is produced. Reformate is an effective reductant for LNT denitration.

U.S. Pat. No. 6,006,515 suggests that a LNT may be regenerated more efficiently by either longer chain or shorter chain hydrocarbons, depending on the LNT composition and the temperature at which regeneration takes place. In order to be able to control the selection between long and short chain hydrocarbons, the patent proposes two fuel injectors, one in the exhaust manifold upstream of the turbocharger and one in the exhaust line immediately before the LNT. Due to the high temperatures in the exhaust upstream of the turbocharger, fuel injected with the manifold fuel injector is said to undergo substantial cracking to form shorter chain hydrocarbons.

During denitrations, much of the adsorbed NOx is reduced to $N_2$, although a portion of the adsorbed NOx is released without having been reduced and another portion of the adsorbed NOx is deeply reduced to ammonia. The NOx release occurs primarily at the beginning of the regeneration. The ammonia production has generally been observed towards the end of the regeneration.

U.S. Pat. No. 6,732,507 proposes a system in which a SCR catalyst is configured downstream of the LNT in order to utilize the ammonia released during denitration. The LNT is provided with more reductant over the course of a regeneration than required to remove the accumulated NOx in order to facilitate ammonia production. The ammonia is utilized to reduce NOx slipping past the LNT and thereby improves conversion efficiency over a stand-alone LNT.

U.S. Pat. Pub. No. 2004/0076565 (hereinafter "the '565 publication") also describes hybrid systems combining LNT and SCR catalysts. In order to increase ammonia production, it is proposed to reduce the rhodium loading of the LNT. In order to reduce the NOx release at the beginning of the regeneration, it is proposed to eliminate oxygen storage capacity from the LNT.

In addition to accumulating NOx, LNTs accumulate SOx. SOx is the combustion product of sulfur present in ordinarily fuel. Even with reduced sulfur fuels, the amount of SOx produced by combustion is significant. SOx adsorbs more strongly than NOx and necessitates a more stringent, though less frequent, regeneration. Desulfation requires elevated temperatures as well as a reducing atmosphere. The temperature of the exhaust can be elevated by engine measures, particularly in the case of a lean-burn gasoline engine, however, at least in the case of a diesel engine, it is often necessary to provide additional heat. Typically, this heat can be provided through the same types of reactions as used to remove excess oxygen from the exhaust. Once the LNT is sufficiently heated, the exhaust is made rich by measures like those used for LNT denitration.

Diesel particulate filters must also be regenerated. Regeneration of a DPF is to remove accumulated soot. Two general approaches are continuous and intermittent regeneration. In continuous regeneration, a catalyst is provided upstream of the DPF to convert NO to $NO_2$. $NO_2$ can oxidize soot at typical diesel exhaust temperatures and thereby effectuate continuous regeneration. A disadvantage of this approach is that it requires a large amount of expensive catalyst.

Intermittent regeneration involves heating the DPF to a temperature at which soot combustion is self-sustaining in a lean environment. Typically this is a temperature from about 400 to about 600° C., depending in part on what type of catalyst coating has been applied to the DPF to lower the soot ignition temperature. A challenge in using this approach is that soot combustion tends to be non-uniform and high local temperatures can lead to degradation of the DPF.

Because both DPF regeneration and LNT desulfation require heating, it has been proposed to carry out the two operation successively. The main barrier to combining desulfation and DPF regeneration has been that desulfation requires rich condition and DPF regeneration requires lean conditions. U.S. Pat. Pub. No. 2001/0052232 suggests heating the DPF to initiate soot combustion, and afterwards desulfating the LNT, whereby the LNT does not need to be separately heated. Similarly, U.S. Pat. Pub. No. 2004/0113249 describes adding reductant to the exhaust gases to heat the DPF, ceasing the addition of reductant to allow the DPF to regenerate, and then resuming reductant addition to desulfate the LNT.

U.S. Pat. Pub. No. 2004/0116276 suggests close coupling a DPF and a LNT, with the DPF upstream of the LNT. The publication suggests that this close-coupling allows CO produced in the DPF during DPF regeneration to assist regeneration of the downstream LNT by removing NOx during DPF regeneration in a lean environment.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations.

SUMMARY

One of the inventors' concepts relates a power generation system, comprising a diesel engine, an exhaust manifold, a turbocharger, and an exhaust line in which are configured a fuel reformer and a LNT. A first fuel injector is configured to inject fuel into the manifold upstream of the turbine. The high temperatures upstream of the turbine cause the fuel to crack into smaller molecules, releasing heat and providing a boost to the turbocharger. The fuel injected into the manifold also undergoes intense mixing as it passes through the turbocharger. Injecting fuel in this manner extends the effective exhaust temperature range over which the fuel reformer can be operated, increases the efficiency with which the reformer uses fuel, and stabilizes the reformer temperature through a better distribution of heat. A second fuel injector can be provided immediately upstream of the fuel injector to provide a less dispersed component to the reformer fuel supply.

Another of the inventors' concepts relates a power generation system, comprising a diesel engine, an exhaust manifold, a turbocharger, and an exhaust line with a DPF. A fuel injector is configured to inject fuel into the exhaust manifold upstream of the turbocharger. A controller is adapted to actuate the fuel injector in order to heat the DPF to initiate self-sustaining combustion of soot in the DPF to remove accumulated soot. The injected fuel undergoes cracking, releasing heat and providing smaller and more reactive molecules. These effects improve the efficiency with which the fuel is combusted over an oxidation catalyst to heat the DPF and reduces the catalyst requirement.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Figure 1:
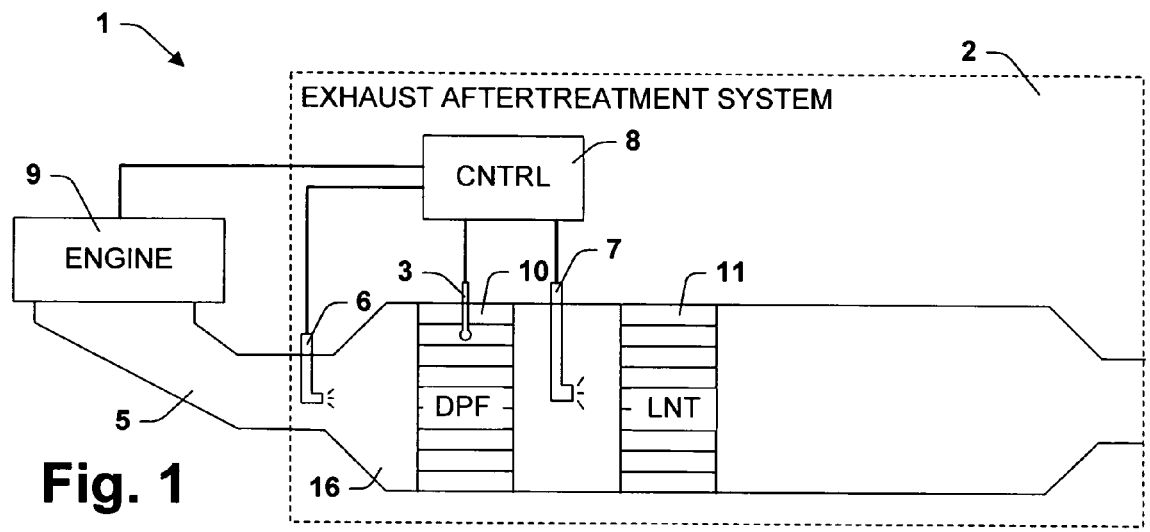
FIG. 1 is a schematic illustration of an exemplary power generation system in which some of the inventors' concepts can be implemented.

One of the inventors' concepts is to carry out soot combustion and LNT denitration simultaneously. FIG. 1 provides a schematic illustration of an exemplary power generation system 1 configured to implement this concept. The system 1 comprises an engine 9 connected by a manifold 8 to an exhaust aftertreatment system 2. The exhaust aftertreatment system 2 comprises an exhaust line 16 in which are configured a first injector 6, a DPF 10, a second injector 7, and a LNT 11, in that order with respect to the direction of exhaust flow from the engine 9. A controller 8 controls reductant flow through the injectors 6 and 7 using information from the engine 9, and a temperature sensor 3.

The controller 8 may be an engine control unit (ECU) that also controls the exhaust aftertreatment system 2 or may include several control units that collectively perform these functions. The controller 8 may have different connections and draw data from different sensors than those illustrated in FIG. 1, depending on the control strategy for the exhaust aftertreatment system 2.

The preferred reductant injected by the injectors 6 an 7 is diesel fuel, in which case these are fuel injectors. The advantage of using diesel fuel as the reductant is that it is readily available on diesel-powered vehicles. Nevertheless, the inventors' concepts extend to systems using other reductants. Examples of other reductants include gasoline, short chain hydrocarbon gases, and syn gas.

Instead of the injector 6, a fuel injector for the engine 9 can be used. A diesel engine fuel injector can inject fuel into the exhaust before it leaves the engine. For example, fuel injection can take place during a cylinder exhaust stroke. Another alternative is to position the injector 6 to inject the reductant into the exhaust manifold 5.

The engine 9 is typically a diesel engine operational to produce a lean exhaust. Lean exhaust generally contains from about 4 to about 20% oxygen. Lean exhaust also generally contains NOx and soot. The engine 9 can be operated to reduce the production of either NOx or soot, but reducing the output of one pollutant typically increases the output of the other. Typical untreated diesel engine exhaust contains environmentally unacceptable amounts of both NOx and soot.

The DPF 10 is operative to remove most of the soot from the exhaust. The LNT 11 is operative to adsorb and store a substantial portion of the NOx from the exhaust, provided the LNT 11 is in an appropriate temperature range. Over time, the DPF 10 becomes filled with soot and begins to lose activity or cause unacceptable backpressure on the engine 9. Also over time, the LNT 11 becomes saturated with NOx and begins to lose its effectiveness as well. Accordingly, both devices must be regenerated from time to time.

The DPF 10 is regenerated by heating it to a temperature at which the accumulated soot undergoes combustion. Combustion is exothermic. If the temperature of the DPF 10 is sufficiently high, there is sufficient soot loading in the DPF 10, and there is sufficient oxygen in the exhaust, soot combustion is self-sustaining. LNT 11 is regenerated by supplying it with reductant at a rate that leaves the exhaust rich.

Regeneration of the DPF 10 is begun by heating the DPF 10. The DPF 10 is heated by injecting reductant using the injector 6. At least a portion of this reductant combusts to heat the DPF 10. The combustion may take place in the DPF 10, provided the DPF 10 has a suitable catalyst, or the combustion may take place in another device upstream of the DPF 10, such as a separate oxidation catalyst. The DPF 10 is heated at least until soot combustion initiates. After soot combustion has initiated, it may be desirable to stop injecting reductant using the fuel injector 6 in order to slow the rate at which the DPF 10 heats, although in certain configurations ceasing reductant injection can actually lead to higher DPF temperatures as discussed more fully below.

LNT regeneration is begun by injecting reductant using the reductant injector 7. Reductant is injected at a rate that leaves the exhaust downstream of the injector 7 rich. LNT regeneration may begin while the DPF 10 is being heated, or as soot combustion begins. In either case, a portion of the oxygen in the exhaust will have been consumed upstream of the injector 7 either by combustion of soot or combustion of reductant from the injector 6.

Simultaneously regenerating the LNT 11 and the DPF 10 can reduce the fuel penalty for regenerating the LNT 11 in at least two ways. One is that reductant used to heat the DPF 10 can serve a dual use; the reductant heats the DPF 10 and the reductant removes oxygen from the exhaust that must be removed to regenerate the LNT 11. The other way is that the oxygen removed from the exhaust by soot combustion does not have to be removed by reductant injection.

This later function is present regardless of how the DPF 10 is heated. Thus, the inventors' concept extends to systems in which the DPF 10 is heated without consuming oxygen from the exhaust. For example the DPF 10 can be heated electrically. Once the DPF 10 is sufficiently hot, the inventors' concept can be implemented by injecting reductant using the injector 7 to make the exhaust rich and regenerate the LNT 11 as soot is combusting in the DPF 10.

Figure 2:
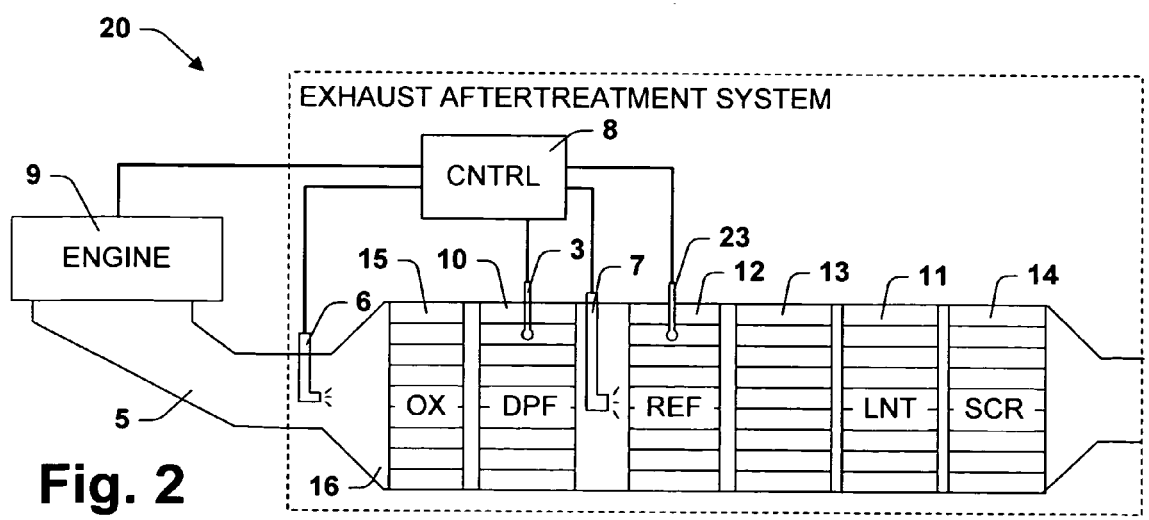
FIG. 2 is a schematic illustration of another exemplary power generation system in which some of the inventors' concepts can be implemented.

The concept of simultaneous LNT and DPF regeneration is particularly useful when the reductant is fuel and the exhaust line 16 comprises a fuel reformer 12 upstream of the LNT 11. FIG. 2 is a schematic illustration of an exemplary power generation system 20 comprising these and other additional components. The additional components include an oxidation catalyst 15, the fuel reformer 12, a thermal mass 13, and a SCR catalyst 14.

The oxidation catalyst 15 is functional to combust reductant from the injector 6 to generate heat for warming the DPF 10. Optionally, the oxidation catalyst 15 is also functional to convert some NO to $NO_2$. $NO_2$ can contribute to the regeneration of the DPF 10 even under lean conditions, provided the DPF 10 has an appropriate catalyst. $NO_2$ may also remove carbonaceous deposits from the fuel reformer 12 and the LNT 11, be adsorbed more efficiently than NO by the LNT 11, and provide the exhaust with an NO to $NO_2$ ratio that results in more efficient NOx reduction by the SCR catalyst 14.

The reformer 12 converts injected fuel into more reactive reformate. An oxidation catalyst could be used in place of the reformer 12, although a fuel reformer is preferred. A reformer that operates at diesel exhaust gas temperatures requires a large amount of catalyst and may excessively increase the cost of an exhaust aftertreatment system. Accordingly, the reformer 12 is preferably of the type that has low thermal mass and must be heated to be operational.

The thermal mass 13 is another optional component placed upstream of the LNT 11. The thermal mass 13 acts to reduce the magnitude of temperature excursion experienced by the LNT 11 due to heat generated in upstream devices. Frequent large temperature excursions can reduce the lifetime of the LNT 11.

The SCR catalyst 14 functions to adsorb and store ammonia generated by the LNT 11 during rich regeneration phases. During the lean phases between regenerations of the LNT 11, the SCR catalyst uses this stored ammonia to reduce NOx slipping past the LNT 11 thus increasing the overall extent of NOx mitigation.

In the system 20, combustion to heat the DPF 10 and soot combustion in the DPF 10 reduce the amount of oxygen that must be removed by the reformer 12 in order for the reformer 12 to produce reformate. In addition, heat generated by these processes can reduce the amount of fuel that must be injected to heat the reformer 12 to an operating temperature.

In one embodiment, upon receiving a signal to commence regeneration, fuel injection through injector 6 begins. The fuel combusts in the oxidation catalyst 15, heats the DPF 10 and, to a lesser extent, heats the reformer 12. Once the DPF 10 reaches a sufficiently high temperature, soot combustion begins. Fuel injection through the injector 7 can begin at any time, but preferably begins after fuel injection through the injector 6 begins, more preferably at about the time that soot combustion begins or shortly thereafter.

If the reformer 12 is not yet warm enough when fuel injection through the injector 7 begins, fuel injection through the injector 7 is at a rate that leaves the exhaust lean, whereby essentially all of the injected fuel is combusted to heat the reformer 12. Once the reformer 12 is sufficiently warm, the fuel injection rate through the injector 7 is increased to a point that leaves the exhaust rich, whereupon reformate production begins. Fuel injection through the injector 7 is terminated when the LNT 11 has been regenerated to a satisfactory extent. Fuel injection through the injector 6 can be terminated once the DPF 10 has reached a temperature where soot combustion is self-sustaining, however, fuel injection through the injector 6 can be continued as long as it does not cause overheating of the DPF 10. Preferably, the period over which the reformer 12 is producing reformate overlaps the period in which soot is combusting within the DPF 10.

In a prior art method, soot combustion in the DPF 10 continues until there is no longer sufficient soot to sustain combustion temperatures. According to another of the inventors' concepts, however, soot combustion can be continued and soot removed to a greater degree. Soot combustion can be continued by injecting fuel through the fuel injector 6 to provide sufficient heat to sustain soot combustion temperatures in the DPF 10. A fuel injection that had been stopped when the DPF 10 first reached a sufficient temperature for self-sustaining soot combustion may be resumed for this purpose. This additional fuel might be considered underutilized if LNT regeneration were not simultaneous. Using the inventors' concept, however, this is fuel that would be required in any event to continue regeneration of the LNT 11.

The systems 1 and 20 can be configured so that the DPF 10 and the LNT 11 are always regenerated simultaneously. However, it is possible to regenerate one device more frequently than the other. The DPF 10 can be regenerated independently of the LNT 11 by using only the injector 6. The LNT 11 can be regenerated independently of the DPF 10 by using only the injector 7 In order that the DPF 10 can be heated quickly with a low fuel penalty and in order that a large portion of the heat generated in the DPF 10 is quickly transported downstream, the DPF 10 preferably has a small thermal mass. A small thermal mass is achieved by having a small size and thin walls. The DPF 10 can be a wall flow filter or a pass through filter and can use primarily either depth filtration of cake filtration. Any DPF with a suitably low pressure drop can be used, but one that uses primarily depth filtration may be more conducive to maintaining a small thermal mass while keeping engine back pressure within acceptable limits.

Cake filtration is the primary filter mechanism in a wall flow filter. In a wall flow filter, the soot-containing exhaust is forced to pass through a porous medium. Typical pore diameters are from about 0.1 to about 1.0 μm. Soot particles are most commonly from about 10 to about 50 nm in diameter. In a fresh wall flow filter, the initial removal is by depth filtration, with soot becoming trapped within the porous structure. Quickly, however, the soot forms a continuous layer on an outer surface of the porous structure. Subsequent filtration is through the filter cake and the filter cake itself determines the filtration efficiency. As a result, the filtration efficiency increases over time. In the prior art, the filter cake was generally allowed to build to a thickness from about 15 to 50 μm deep before regeneration began. In the present invention, if a wall flow filter is used, regeneration begins before the cake is about 10 μm deep, more preferably before the cake about 5 μm deep, still more preferably before the cake is about 2 μm deep.

For a wall flow filter, a small size is typically about 1/10th the engine displacement or less. Preferably, the size is about 1/20th the engine displacement or less. The diameter of the DPF 10 is preferably about the same as that of an upstream or downstream abutting exhaust pipe. Wall flow filters are typically made from ceramics, especially cordierite or SiC.

In contrast to a wall flow filter, in a flow through filter the exhaust is channeled through macroscopic passages and the primary mechanism of soot trapping is depth filtration. The passages may have rough walls, baffles, and bends designed to increase the tendency of momentum to drive soot particles against or into the walls, but the flow is not forced though micro-pores. The resulting soot removal is considered depth filtration, although the soot is generally not distributed uniformly with the depth of any structure of the filter. Preferably, the filter has metal walls, which can be made very thin to keep the thermal mass low. Emitec™ produces such filters. A flow through filter can also be made from temperature resistant fibers, such as ceramic or metallic fibers, that span the device channels. A flow through filter can be larger than a wall flow filter having equivalent thermal mass Reducing the size of the DPF 10 generally involves a reduction in soot storage capacity. This is acceptable in that the DPF 10 can be regenerated much more frequently than a conventional DPF, which would be regenerated much less frequently than the LNT 11. In order to maintain the functionality of the DPF 10, the DPF 10 must generally be regenerated at least about 20% as often as the LNT 11, more typically at least about 50%, and still more typically at least about 70% as often. In other terms, the DPF 10 generally needs to be regenerated at least about once every 10 minutes, more typically at least about once every 5 minutes, still more typically at least about once every 3 minutes.

It is acceptable if the DPF 10 is regenerated more often than necessary, but the above regeneration requirements are indicative of the DPF 10 being optimally sized for use in conjunction with the inventors' concepts. Having a somewhat greater capacity in the DPF 10 than in the LNT 11 facilitates a simplified control scheme, where only the criteria for LNT regeneration is examined by the controller 8, it being assumable that if the LNT 11 is being regenerated often enough, the DPF 10 is being regenerated often enough as well.

If it is difficult to achieve a target level of particulate emission control while maintaining a sufficiently small size of the DPF 10, one option is to install a second DPF downstream of the LNT 11. For example, this second DPF might be used as the thermal mass 13. The second filter can be of the wall flow type and much large than the DPF 10. Preferably, however, the majority of the particulates are removed by the DPF 10. The second DPF can be heated for regeneration in conjunction with heating of the LNT 11 for desulfation.

The time at which to regenerate the LNT 11 to remove accumulated NOx can be determined by any suitable method. Examples of methods of determining when to begin a regeneration include initiating a regeneration upon reaching a thresholds in any of a NOx concentration in the exhaust, a total amount of NOx emissions per mile or brake horsepower-hour over a previous period or since the last regeneration, a total amount of engine out NOx since the last regeneration, an estimate of NOx loading in the LNT 11, and an estimate of adsorption capacity left in the LNT 11. Regeneration can be periodic or determined by feed forward or feedback control. Regeneration can also be opportunistic, being triggered by engine operating conditions that favor low fuel penalty regeneration. A threshold for regeneration can be varied to give a trade off between urgency of the need to regenerate and favorability of the current conditions for regeneration. The time at which to regenerate the LNT 11 can be determined by the controller 8, which generates a control signal that initiates the regeneration process.

In addition to the option of carrying out denitration simultaneously with soot combustion, the inventors have also conceived the idea of carrying out desulfation simultaneously with soot combustion. This latter concept can be implemented with systems having the same schematic structures as the systems 1 and 20 illustrated in FIGS. 1 and 2. The main differences from the previous description are in terms of the size of the DPF 10 and the method of operation.

When implementing the concept of simultaneous soot combustion and desulfation, the operation of systems 1 and 20 between regenerations remains the same as previously described. The DPF 10 accumulates soot and the LNT 11 stores a portion of the exhaust NOx. In the system 20, the SCR 14 reduces a portion of the NOx slipping past the LNT 11 using stored ammonia.

During LNT denitration, the DPF 10 is generally not heated significantly and continues to accumulate soot. LNT denitration is carried out with reductant injection, which may be carried out using either or both the injectors 6 & 7. For the system 20, fuel is first injected at a rate that leaves the exhaust lean and heats the reformer 12, then at a rate that leaves the exhaust rich, causing reformate to be produced and regenerating the LNT 11.

The LNT 11 can be desulfated independently of regenerating the DPF 10 and the DPF 10 can be regenerated independently of desulfating the LNT 11, however, preferably the DPF 10 is regenerated each time the LNT 11 is desulfated. More preferably regeneration of the DPF 10 and desulfation of the LNT 11 are always simultaneous.

If desulfation is to be carried out simultaneously with soot combustion, the DPF 10 is preferably large enough to only require soot combustion approximately as often as the LNT 11 requires desulfation. A conventionally sized wall-flow DPF may serve this purpose. Generally the LNT 11 must be desulfated at least about 20% as often as the DPF 10 needs to be regenerated, more typically at least about 50%, and still more typically at least about 70% as often.

It is acceptable if the LNT 11 is desulfated more often than necessary, but the above regeneration requirements are indicative of the DPF 10 being optimally sized for use in conjunction with the inventors' concept of making LNT desulfation simultaneous with soot combustion. If one of the DPF 10's storage capacity for soot (in terms of lengths of times between regenerations) and the LNT 11's storage capacity for sulfur is greater than the other, the frequency of simultaneous regenerations can be based on the requirements of the device needing the more frequent regenerations.

The times to regenerate the DPF 10 and desulfate the LNT 11 can be determined in any suitable fashions. When the DPF 10 is a wall flow filter, the time to regenerate the DPF 10 can be determined by monitoring the pressure drop across the DPF 10. Desulfation may be scheduled periodically, e.g., after every 30 hours of operation. Alternatively, desulfation may be scheduled based on an estimate of the amount on SOx stored in the LNT 11. The amount of stored SOx can be assumed to increase in proportion to fuel usage and to decrease in a manner dependent on the extent of desulfations. A further option is to determine the need for desulfation based on system performance, e.g., based on the activity of the LNT 11 following an extensive denitration or based on the frequency with which denitration is required To initiate soot combustion and DPF regeneration, reductant is injected through the injector 6. The injected reductant combusts, heating the DPF 10 and, to a lesser extent, the downstream LNT 11. Eventually soot combustion in the DPF 10 begins. Soot combustion provides additional heat the DPF 10.

Heat from the DPF 10 will eventually warm the LNT 11, but rather than waiting for this processes, the LNT 11 can be separately heated by injecting reductant through the injector 7 at a rate that leave the exhaust lean. In the case of the system 20, the rate of this injection may need to be limited to avoid overheating the reformer 12.

Once the DPF 10 has reached a sufficient temperature for self-sustaining soot combustion, the reductant injection through the injector 6 may be discontinued. Once the LNT 11 has reached a sufficient temperature for desulfation, the reductant through the injector 7 is increased to a rate that makes the exhaust rich and causes desulfation in the LNT 11. As in the case of simultaneous soot combustion and LNT denitration, soot combustion in the DPF 10 reduces the amount of reductant that must be injected to consume excess oxygen and thereby reduces the fuel penalty for desulfating the LNT 11. Additional fuel is saved in that heat from the DPF 10 warms the LNT 11.

Soot combustion during desulfation also promotes stable operation of the reformer 12. As discussed more fully below, the reformer 12 may have a tendency to overheat when operated steadily for long periods. Removing some of the oxygen from the exhaust mitigates this overheating problem. More heat is generated in the DPF 10 by soot combustion to approximately the same extent that less heat is produced in the reformer 12 due to less remaining oxygen, and the heat from the DPF 10 tend to be transported to the reformer 12, however, overheating of the reformer 12 is nonetheless mitigated due to heat losses to the surroundings and more uniform heat distribution.

Even when the DPF 10 is sized for simultaneous soot combustion and desulfation, rather than simultaneous soot combustion and denitration, the injector 6 may be used for LNT denitration. Fuel injected using the injector 6 that does not fully combust before it reaches the reformer 12 becomes better mixed with the exhaust than fuel injected using the injector 7. The fuel injected with injector 6 also tends to become more dispersed along the direction of flow, which could be a disadvantage if injector 6 were the only one used. Combining the two fuel injectors, however, allows a balance between good mixing and precise control of exhaust air-fuel ratios at the reformer 12. Such a balance is easier to achieve if there is no oxidation catalyst 15 and the DPF 10 has a relatively low catalyst loading whereby a substantial portion of the fuel injected by the injector 6 makes it to the reformer 12.

Figure 3:
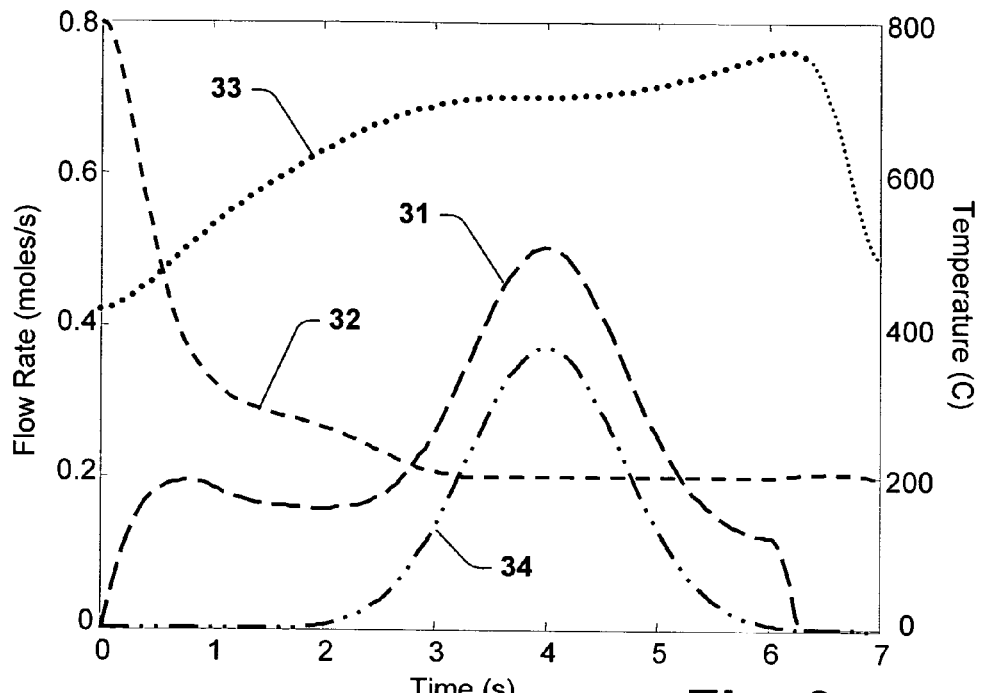
FIG. 3 is a plot showing a preferred reformer fuel profile for LNT regeneration.

FIG. 3 illustrates a preferred reductant fuel injection profile for denitrating a LNT positioned in an exhaust line downstream of a fuel reformer. Line 31 is the fuel injection rate, line 32 is the exhaust oxygen flow rate (controlled through an engine intake air throttle), line 33 is the resulting reformer temperatures, and line 34 is the resulting reformate flow rate. After an initial heating period, the fuel injection 31 is controlled through an approximately Gaussian profile, which causes the reformate flow rate 34 to begin relatively low, increase to a maximum, and then decreases toward the end. This type of reformate profile has been found to provide superior denitration fuel efficiency in comparison to a constant reformate flow profile. The superior efficiency is in terms of less NOx slip during denitration, more conversion of stored NOx per unit fuel used, and more ammonia production during regeneration.

A theory that explains the functionality of this preferred reductant flow rate or concentration profile is that the reductant supply rate approximately matches the NOx release rate. At the beginning of regeneration, reductant is consumed by reaction with oxygen stored in the LNT 11. Until this stored oxygen is removed, reduction of NOx is not effective, particularly not deep reduction of NOx to $NH_3$.

Regeneration does not take place uniformly throughout the LNT 11. Oxygen is first removed near the entrance. The point of oxygen removal is believed to form a front that moves towards the exit of the LNT 11. As this front moves through the LNT 11, a greater and greater portion of the LNT 11 is essentially free of stored oxygen and begins to undergo release of stored NOx. As this portion of the LNT 11 increases, the NOx release rate also increases. By progressively increasing the reductant supply rate, this release rate can be approximately matched by the reductant supply rate while oxygen is being removed at a relatively constant speed. Eventually, after essentially all of the stored oxygen is removed and the NOx release rates in the oxygen-free zones are ebbing due to depleting reserves of stored NOx, the overall NOx release rate decreases. By decreasing the reductant supply rate toward the end of the regeneration, the reductant supply rate can be approximately matched to the NOx release rate in the latter part of the regeneration as well.

A highly dispersed fuel injection from the injector 6 can naturally provide a Gaussian profile of the type desired. When a more exact control of the fueling rate is desired, for LNT warm-up or perhaps upon the transition from lean to rich, the fuel injector 7 can used. Together, the two can provide any desired profile and a balance between precise control of profile shape and excellent mixing of fuel and exhaust.

If there are devices comprising oxidation catalysts between the upstream inject 6 and the reformer 12, some of the injected fuel will not reach the reformer 12. The reformer temperatures may be different as a result of this oxidation, but the reformate production rates will be much the same in that, excepting the effect on reformer temperatures, it makes little difference whether oxidation takes place in the reformer 12 or upstream of it.

The different distribution of heat depending on whether fuel is injected using the injector 6 or the injector 7 can be used to stabilize operation of the fuel reformer 12. When a fuel reformer of the preferred type is operated to produce reformate at high exhaust oxygen concentrations, e.g., 8-15%, there is a tendency of the reformer 12 to overheat. In principle, overheating could be reduced by increasing the fuel injection rate, which would be expected to increase the rate of endothermic reaction (2) while the rate of exothermic reaction (1) remains constant. In practice, however, the reformer 12 and the LNT 11 generally cannot operate efficiently with such high fueling rates. An alternative solution is to pulse the fuel injection to the reformer 12, allowing the reformer 12 to cool between pulses. Disadvantages to fuel pulsing include loss of efficiency due to reductant from rich phases reacting with oxygen from lean phases.

The structure illustrated in FIG. 2 provides a different way to control heating in the fuel reformer 12. Even if the DPF 11 is not being regenerated, a portion of the fuel required to make the exhaust lean and produce a target amount of reformate can be injected using the injector 6. Much of the injected fuel combusts over the oxidation catalyst 15 or in the DPF 10, removing a portion of the oxygen from the exhaust and releasing heat.

Even though the same amount of heat is generated, overheating of the reformer 12 can be reduced. If the DPF 10 is not fully heated, as in during denitrations when soot combustion is not also being carried out, the heat can be stored in the DPF 10 and slowly released. If the DPF 10 heats to a steady state temperature, as during a prolonged desulfation, a greater portion of the total heat generated is lost to the surroundings upstream of the reformer 12. That heat that does reach the reformer 12 from the DPF 10 is less problematic than if it were generated in the reformer 12 in that the heat is more evenly distributed. Overheating tends to occur in local hot spots.

Figure 4:
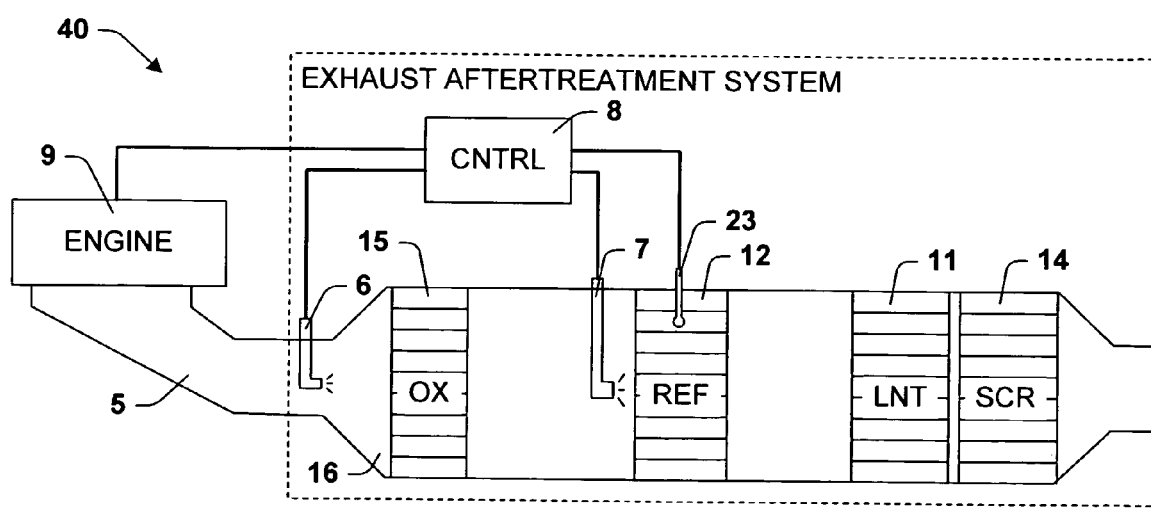
FIG. 4 is a schematic illustration of another exemplary power generation system in which some of the inventors' concepts can be implemented.

The concept of controlling the reformer temperature by using selective distribution of fuel between two injection points can be implemented without the DPF 12 using, for example, a system as illustrated in FIG. 4 where there is an oxidation catalyst 15 between the upstream point of fuel injection and the reformer 12. The fuel required by the reformer 12 in FIG. 4 can be selectively distributed between the fuel injectors 6 and 7. In order to facilitate temperature control by this method, the oxidation catalyst 15 can be specifically designed to readily lose heat to the surroundings. Such a design may involve a high external surface area and conductive rather than insulating packaging.

Figure 5:
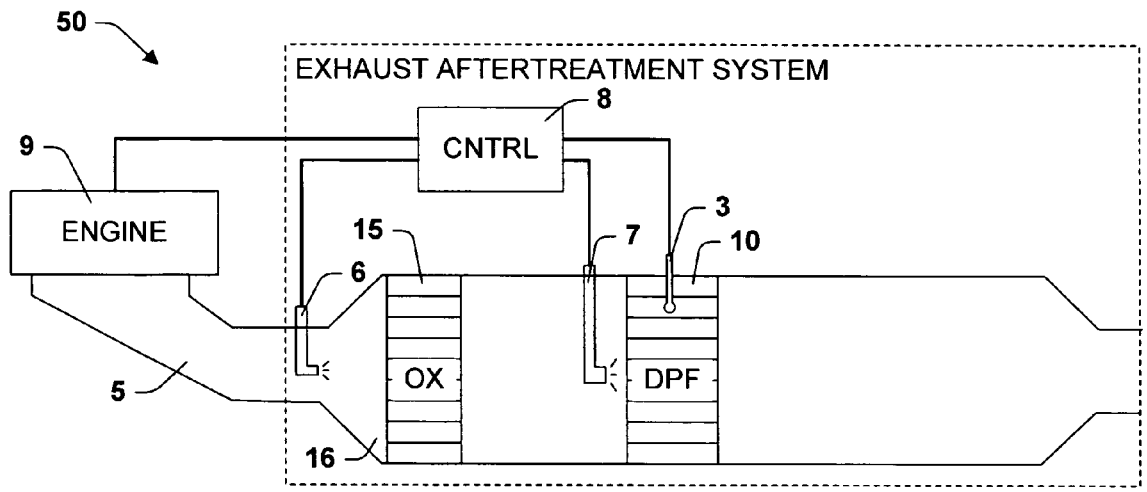
FIG. 5 is a schematic illustration of another exemplary power generation system in which some of the inventors' concepts can be implemented.

This same concept can be applied, perhaps with even greater effect, to controlling the temperature of the DPF 10. FIG. 5 provided an exemplary power generation system 50 for implementing this concept. To begin DPF regeneration in the system 50, the DPF 10 can be heated by injecting reductant through the injector 6. The reductant combusts in the oxidation catalyst 15, generating heat that warms the DPF 10.

Once soot combustion reaches a self sustaining temperature, the fuel injection optionally ceases, however, if soot combustion threatens to overheat the DPF 10, fuel injection can counter-intuitively be increased. Rather than aggravating the overheating problem, this mitigates the problem. The injected fuel combusts in the oxidation catalyst 15, removing oxygen from the exhaust. This oxygen is no longer available in the DPF 10, thus reducing the soot combustion rate. The same total amount of heat may be released, but the distribution is significantly different. The heat may temporarily reside in the oxidation catalyst 15 and the DPF 10 may have already begun to cool by the time the heat is transferred downstream. There will be greater heat lost to the surroundings upstream of the DPF 10 due to the higher temperatures. Finally, soot combustion tends to occur along narrow fronts. Whereas the heat produced from these fronts is concentrated, the heat transferred to the DPF 10 through the exhaust is rather evenly distributed. If temperatures in the DPF 10 can be effectively controlled, a less expensive substrate can be used resulting in significant cost savings. In particular, cordierite can be used instead of the more expensive SiC.

Figure 6:
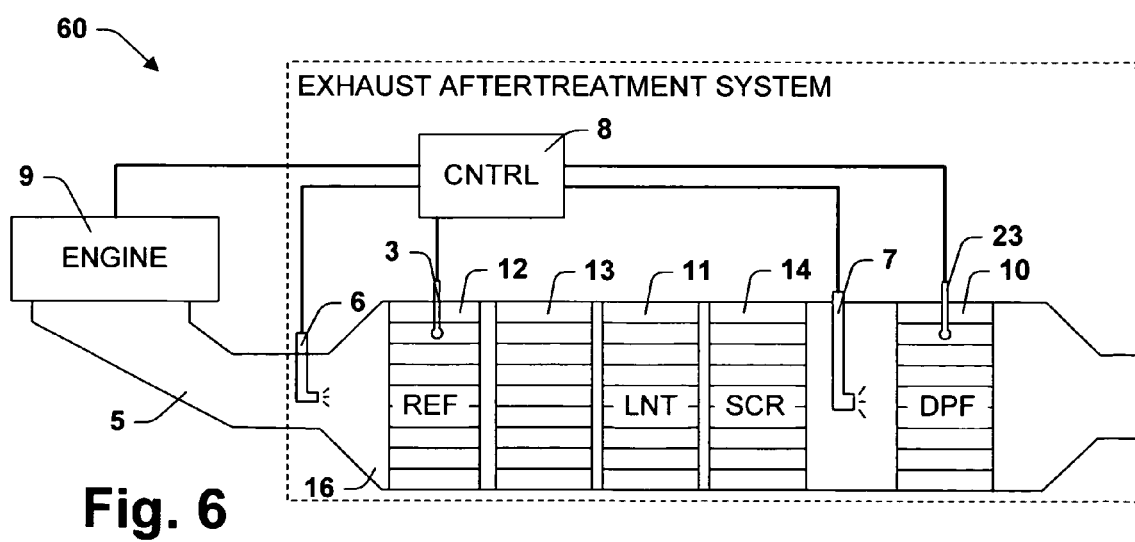
FIG. 6 is a schematic illustration of another exemplary power generation system in which some of the inventors' concepts can be implemented.

FIG. 6 provides another power generation system 60 in which the concept of limiting DPF temperatures using reductant injection can be implemented. The power generation system 60 contains several bricks between the upstream injector 6 and the DPF 10. These bricks include the reformer 12, the thermal mass 13, the LNT 11, and the SCR catalyst 14. Soot combustion can be initiated using the downstream injector 7. When soot combustion rates become too high, reductant injection through the injector 6 can commence. The fuel injected upstream will be combusted in the reformer 12, consuming oxygen from the exhaust, but causing little heating of the DPF 10 due to the thermal mass of the reformer 12 and the various intervening devices.

The concept of limiting the DPF temperature using upstream reductant injection can be implemented with either feedback or feed forward control. Feed back control involves the use of one or more temperature sensors, like the sensor 3. If the sensor readings are subject to significant delays, it may be desirable to correct them by extrapolation or some other method to obtain and estimate of the current temperature. A typical feedback control strategy is PID control, with the degree of fueling tending to increase in proportion to the extent to which a DPF temperature is in excess of a target maximum.

In some cases, feed forward control may be more desirable. One reason to use feed forward control is that hot spots may tend to occur locally in the DPF 10, with the hot spots moving as soot combustion progresses. Because the hot spots are local and not always in the same location, it may be inadequate to rely on sensors. On the other hand, a model, particularly one that is corrected using some sensor data, can predict local hot spots.

Another option is to simply control the fuel injection according to a pre-determined program. A characteristic of such a program implementing the inventors' concepts is that the injection rate through the injector 6 is maintained or increased after soot combustion within the DPF 10 has reached a self-sustaining rate. In an exemplary program using just one fuel injector, the reductant injection begins at a rate designed to heat the DPF 10. After soot combustion begins, the rate is maintained. As soot combustion completes, the rate of reductant injection is gradually decreased.

In an exemplary method using two fuel injectors, fuel injection begins immediately upstream of the DPF 10 at a rate designed to heat the DPF 10. After soot combustion has reached a self-sustaining rate, fuel injection immediately upstream of the DPF 10 ceases. After soot combustion has begun in the DPF 10, but before soot combustion reaches an excessive rate, fuel injection begins at a point further upstream, whereby combustion significantly reduces the flow rate of oxygen into the DPF 10. The upstream fuel injection may be maintained until the DPF 10 is nearly regenerated.

Additional measures may be used to limit the exhaust oxygen flow rate. Examples of such measures include increasing exhaust gas recirculation (EGR), throttling the engine air intake, and shifting gears to make the engine run at lower speeds. All of these methods can be used together with the inventors' concepts to limit the rate of soot combustion and heating in the DPF 10.

Figure 7:
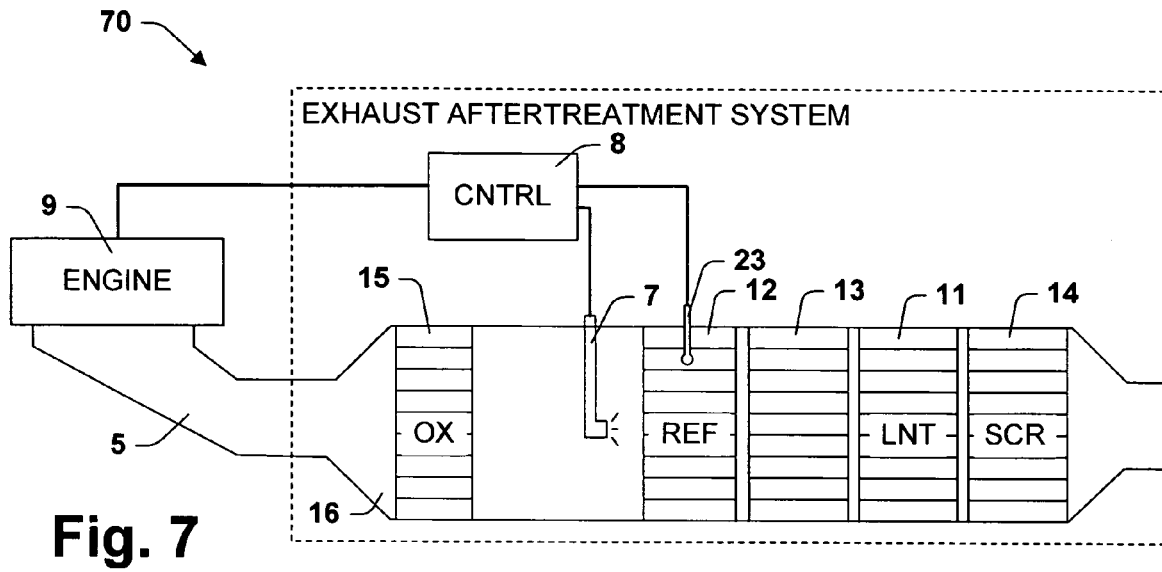
FIG. 7 is a schematic illustration of another exemplary power generation system in which some of the inventors' concepts can be implemented.

Another related concept involves placing an oxidation catalyst upstream of a fuel reformer or an oxidation catalyst-containing DPF. An example with a fuel reformer is the power generation system 70 schematically shown in FIG. 7. The power generation 70 comprises a diesel engine 9, an oxidation catalyst 15, a reductant injector 7, a fuel reformer 12, a LNT 11, and a SCR catalyst 14.

Although the reformer 12 itself contains an oxidation catalyst, the upstream oxidation catalyst 15 can perform several functions. One function is to reduce the oxygen content of the exhaust by combusting hydrocarbons also contained in the exhaust. As in the other concepts, the same amount of heat is generated, but at a point displaced from the reformer 12. During regeneration of the LNT 11, the engine 9 can be operated to provide additional hydrocarbon to augment this function. In addition to simply injecting the hydrocarbons, the engine 9 can provide additional hydrocarbon by operating near or beyond the smoke limit.

Additional hydrocarbons may also be provided as a natural consequence of other measures used to reduce the oxygen concentration of the exhaust during regeneration of the LNT 11. Examples of such measures may include increasing EGR rates, throttling the engine air intake, and shifting gears to reduce the engine speed. Additional hydrocarbons can also be provided by increasing engine fueling rates. These additional hydrocarbons can be combusted in the oxidation catalyst 15 while causing only attenuated heating of the reformer 12

The oxidation catalyst 15 can perform additional functions as well. One such function is that it can operate to heat the exhaust slightly even when the LNT 11 is not being regenerated. This additional heat can extend the operating temperature range of the reformer 12, allowing the reformer 12 to be started at lower exhaust temperatures. This function can be facilitated by placing the oxidation catalyst 15 as close to the engine as possible, whereby the exhaust will keep the catalyst 15 at relatively higher temperatures.

A further advantage of catalyzing or fueling combustion to remove some of the exhaust oxygen upstream of the reformer 12 is that it facilitates more precise control of the reformer 12. The oxygen concentration or lambda value of the exhaust between the oxidation catalyst and the reformer can be measured for use in this control. Because less oxygen needs to be removed, the fuel dose immediately upstream of the reformer 12 is smaller and can be controlled more accurately.

Another potential use for the oxidation catalyst 15 is converting NO to $NO_2$. The $NO_2$ can function to remove carbonaceous deposits from the reformer 12 and the LNT 13. Increasing the proportion of the $NO_2$ in the exhaust can also enhance NOx removal by the LNT 12 and the SCR catalyst 14. Generally, more catalyst is required to effectuate the NO to $NO_2$ function than the more basic hydrocarbon oxidation function.

Figure 8:
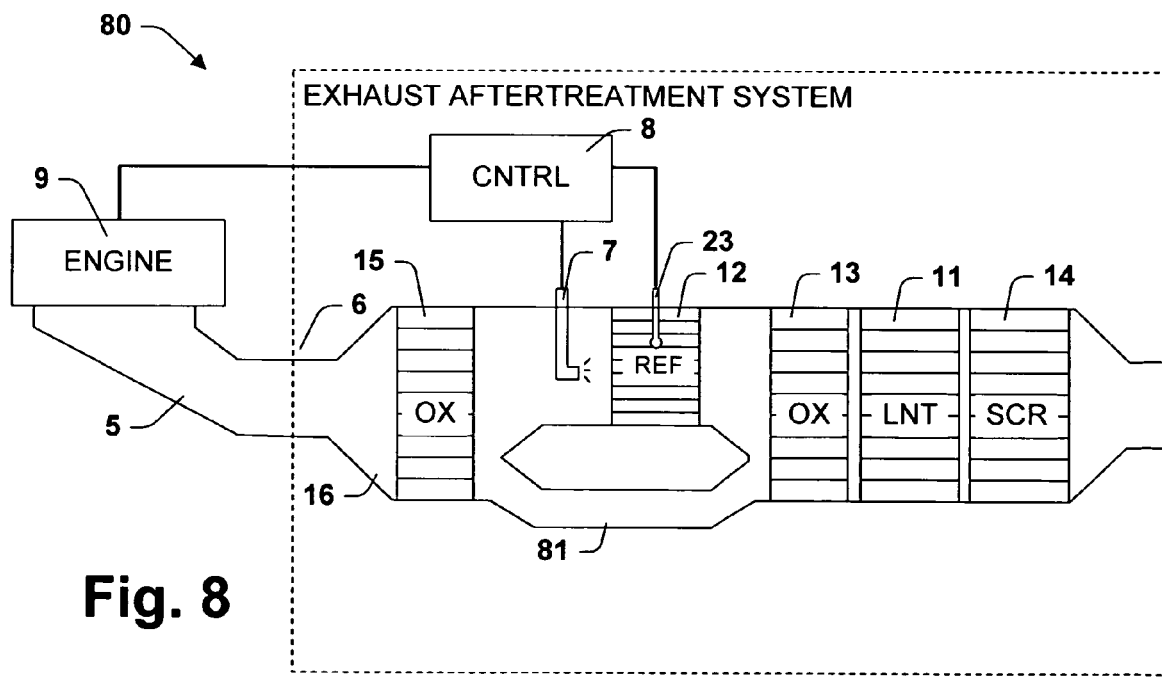
FIG. 8 is a schematic illustration of another exemplary power generation system in which some of the inventors' concepts can be implemented.

The upstream oxidation catalyst is also useful when the reformer 12 is in a separate branch from the main exhaust line. FIG. 8 provides a schematic illustration of a power generation system 80 having this type of branching. In the system 80, the fuel reformer 12 is in the main exhaust line, but it is essentially the same if the fuel reformer 12 is in the bypass line 81 and the main exhaust line in parallel with the branch is empty.

The power generation system 80 is designed without exhaust system valves. An exhaust system valve or damper can be used to control the distribution of exhaust between branches. Such control is desirable in terms of limiting fuel penalty, but exhaust treatment systems with exhaust valves may be less reliable than exhaust treatment systems without valves.

Figure 9:
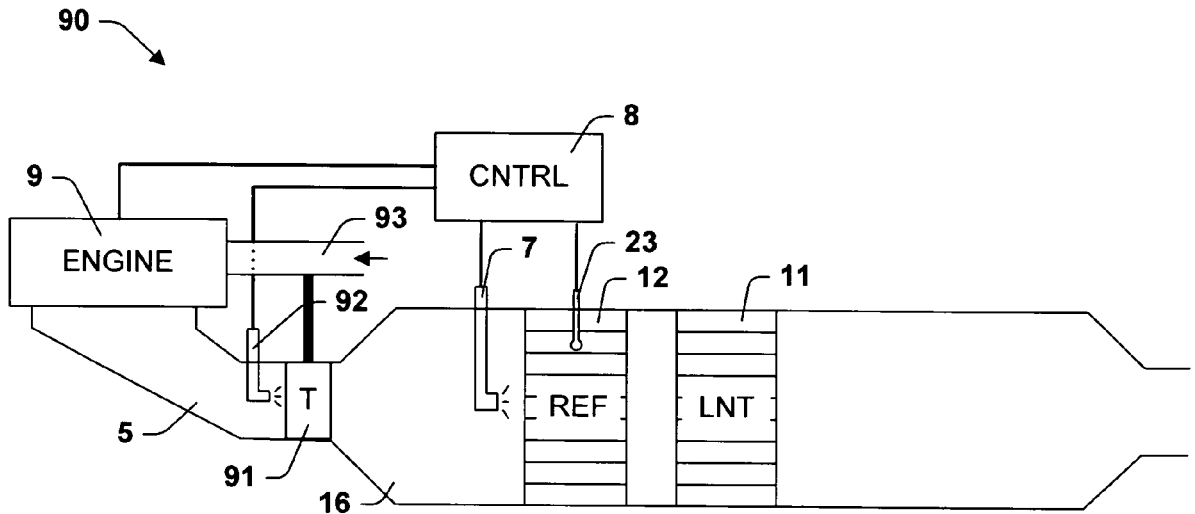
FIG. 9 is a schematic illustration of another exemplary power generation system in which some of the inventors' concepts can be implemented.

An additional improvement that is applicable to several of the above-described concepts is to place a fuel injector in an exhaust manifold upstream of a turbocharger. FIG. 9 provides a schematic illustration of an exemplary power generation system 90 implementing this concept. The engine 9 operates to produce exhaust which passes through the exhaust manifold 5 to the exhaust line 16. The exhaust line 16 contains a fuel reformer 12 and a LNT 11, although the concept is not limited to these exhaust line components. The manifold contains turbocharger 91, which is configured to provide pressurized air to the inlet 93 of the engine 9. An injector 92 is configured to inject a reductant into the manifold 5 upstream of the turbocharger 91.

One advantage of manifold reductant injection is that the reductant undergoes intense mixing with the exhaust as it pass through the turbocharger 91. Thorough mixing promotes better utilization of the reductant in downstream devices, which is particularly important if the reductant is diesel fuel. The types of devices that can benefit from this mixing include fuel reformers, oxidation catalysts, and DPFs.

Another advantage is that the exhaust is hotter upstream of the turbocharger 91. At these higher temperatures, the reductant can undergo reactions. In the case of diesel fuel, these reactions include cracking of the diesel fuel into smaller and more reactive molecules. These reactions generally involve expansion of the gases and the release of heat. On the one hand, these reactions can provide a boost to the turbocharger 91. On the other hand, these reactions can release heat and consume oxygen, thus displacing heat from a downstream device as is done with the oxidation catalyst 15 in FIG. 5. The function is also similar to the oxidation catalyst 15 in FIG. 5 in that the release of heat and the production of smaller more reactive reductant molecules can facilitates low temperature start-up of downstream devices, such as a DPF 10 or a reformer 12.

If the first downstream device is a DPF 10, the use of the manifold fuel injector 92 can reduce the amount of oxidation catalyst required. The DPF 10 may be loaded with oxidation catalyst to allow light-off through the addition of fuel that combusts in the DPF 10. The same oxidation catalyst can promote soot combustion. By reducing the amount of catalyst, not only can the cost be reduced, but also soot combustion rates and problems with excessively high DPF temperatures during soot combustion.

A potential problem with the manifold injector 90 and other exhaust system injectors is coking. Coke can form from residual fuel left in the injector when the injector is off, particularly if the injector is off for long periods of time during which it is subject to high temperatures. Coke can deteriorate injector performance and cause failures.

Figure 10:
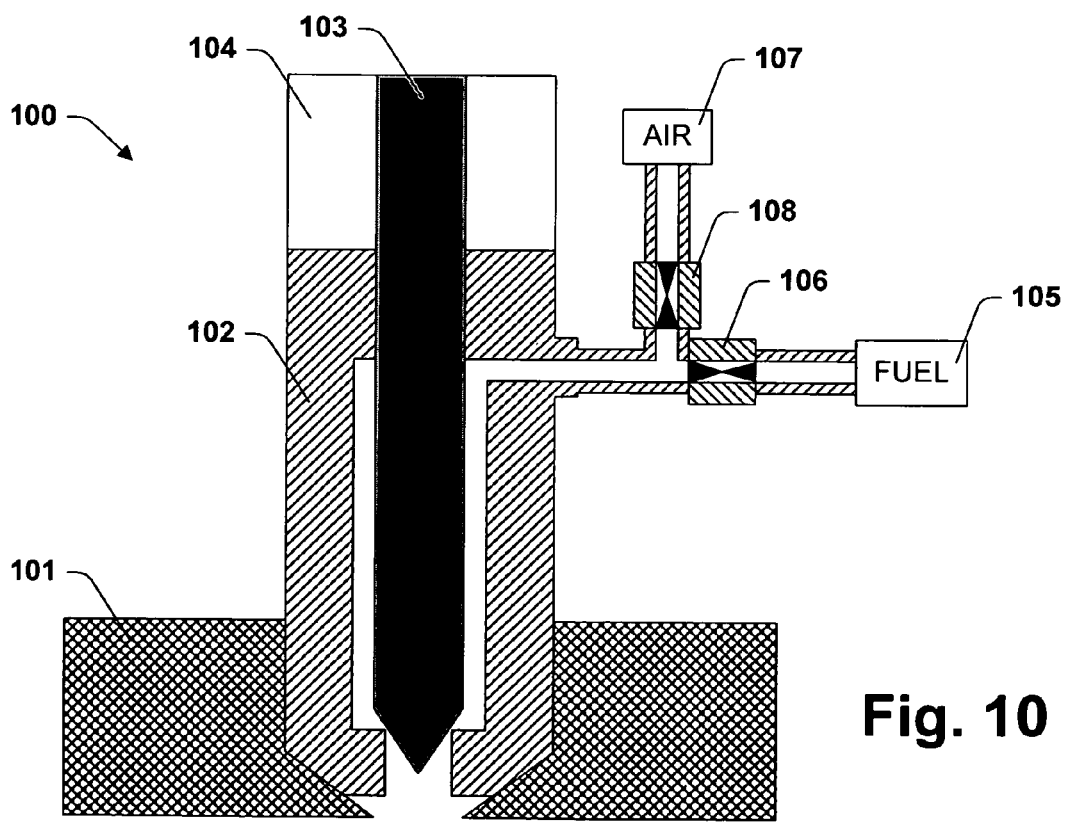
FIG. 10 is a schematic illustration of an exemplary fuel injector for use with some of the inventors' concepts can be implemented.

FIG. 10 illustrates a fuel injector 100 adapted to implement an air purge method to the coking problem. The fuel injector 100 is shown installed within a wall 101 of an exhaust passage, which may be an exhaust line or an exhaust manifold. The fuel injector 100 comprises a valve body 102, a needle 103, a solenoid 104 for controlling the position of need 103, a fuel source 105, a valve 106 for controlling the fuel flow from the fuel source 105, an air supply 107, and a valve 108 for controlling the flow of air from the air supply 107.

When fuel injection is required, the valve 106 opens to admit fuel from the fuel source 105. Optionally, the valve 106 is opened and closed rapidly in a controlled manner to regulate the fuel flow rate. Once the fuel dosing is complete and the valve 106 is finally closed, valve 108 is opened briefly to admit air from air supply 107. The air flows through the valve body 102, flushing the passages therein of fuel, whereby little or no fuel remains to form coke.

The air supply 107 can be any suitable source of pressurized air. Examples of pressurized air sources are an air pump, an intake manifold pressurized by a turbocharger, and an exhaust manifold upstream of a turbocharger (providing the injector 100 is not itself installed in an exhaust manifold). In a preferred embodiment, the pressurized air is drawn from a truck braking system.

The fuel supply 105 can be any suitable source of fuel. A standard fuel pump can be used to obtain fuel from a vehicle fuel tank. To promote atomization, vaporization, and mixing, however, it can be desirable to obtain higher pressures than the 3 to 6 bars provided by a standard electric fuel pump. To obtain higher pressures, it is preferred to use a pressure intensifier.

Figure 11A:
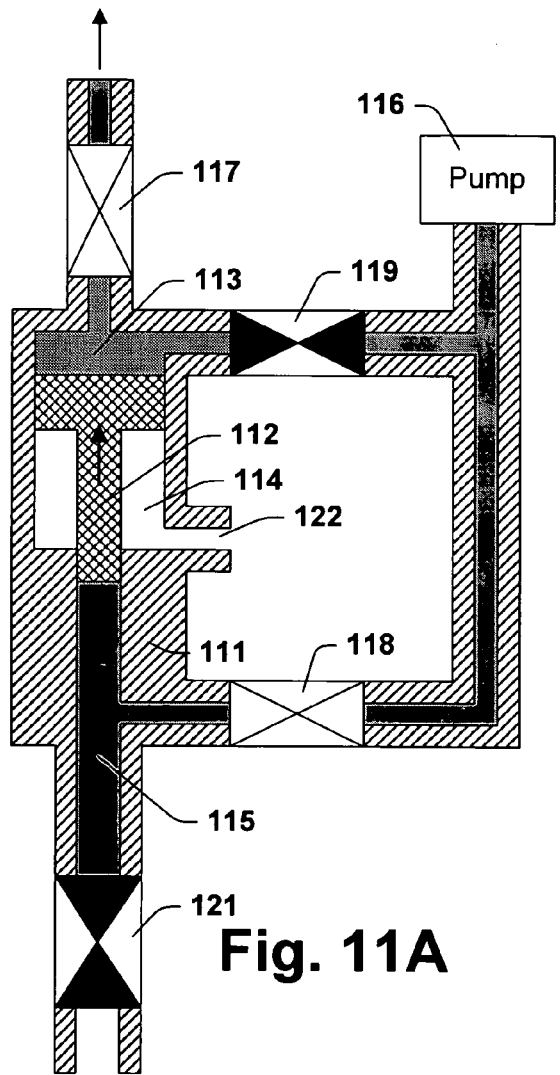
FIG. 11A is a schematic illustration of an exemplary pressure intensifier in a fuel intake configuration.
Figure 11B:
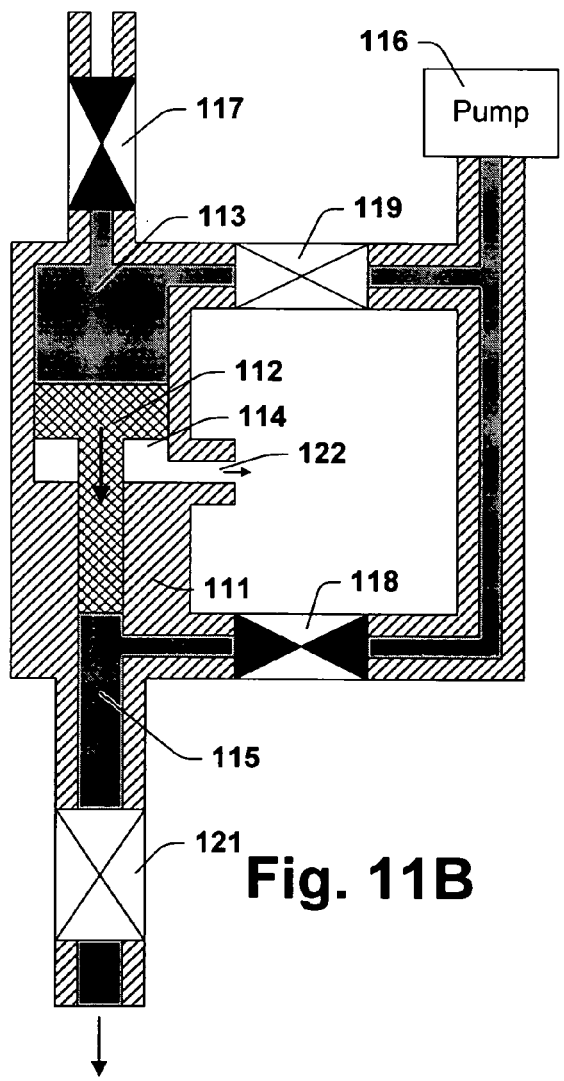
FIG. 11B is a schematic illustration of an exemplary pressure intensifier in a fuel expelling configuration.

FIGS. 11A and 11B illustrates a pressure intensifier 110. The pressure intensifier contains a body 111 and a piston 112 defining an upper chamber 113, a middle chamber 114, and a lower chamber 115. The intensifier is charged with low pressure fuel from pump 116 as illustrated in FIG. 11A by opening valve 117 and 118 and closing valve 119 an 121. Fuel enters the lower chamber through valve 118, forcing the piston 112 to rise, forcing fuel out of the upper chamber 113, through valve 117, to a reservoir from which the pump 116 draws fuel.

Fuel is expelled at high pressure through valve 120 as illustrated in FIG. 11B by closing valves 117 and 118 and opening valves 119 and 121. The pump 116 pumps fuel into the upper chamber 113 through the valve 119. The fuel in the upper chamber acts on the piston 112 to force fuel out of the lower chamber 115 through the valve 121. Because the area of the upper surface of the piston 112, which is acted on by the fuel in the upper chamber 113 at the pump pressure, is greater than the area of the lower surface of the piston 112, which acts on the fuel in the lower chamber 115, the fuel in the lower chamber 115 can be pressurized in proportion to the difference in area. Preferably, the fuel is pressurized by at least a factor of 2, more preferably by at least a factor of three. The middle chamber 114 accumulates fuel slipping between the piston 112 and the walls of the body 111. The accumulated fuel is returned to the pump reservoir through port 122

In addition to coking, manifold and exhaust system fuel injectors may be susceptible to overheating. One method to avoid overheating is to provide an excess fuel flow to the fuel injector. The excess fuel flow is returned to the fuel reservoir, carrying away heat. Circulating fuel in this manner also prevents coking. The fuel flow can be maintained as long as the injector is subject too high temperatures.

Figure 12:
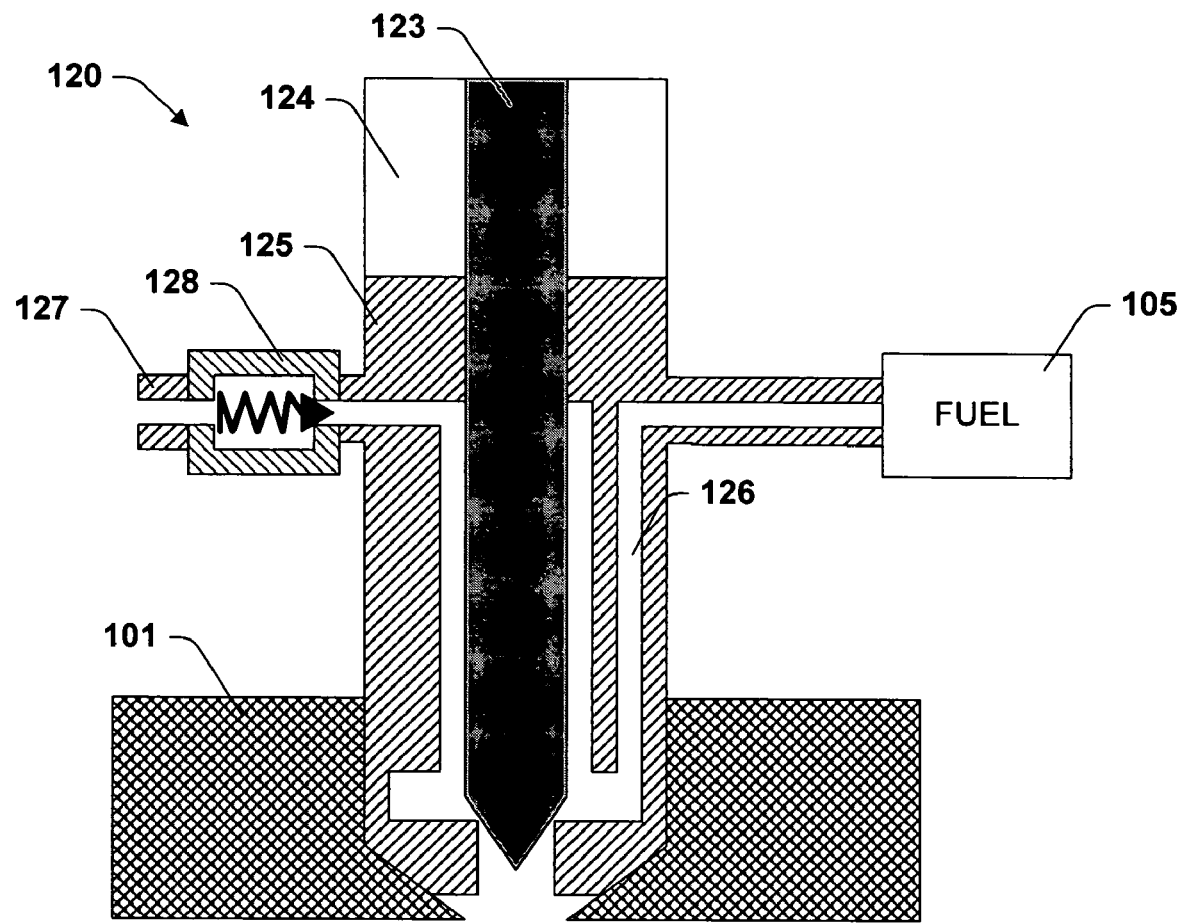
FIG. 12 is a schematic illustration of another exemplary fuel injector for use with some of the inventors' concepts can be implemented.

FIG. 12 illustrates and exemplary fuel injector 120 designed to accommodate an excess fuel flow. The fuel injector 120 comprises a valve body 125 having internal passages 126, a needle 123, a solenoid 124 for controlling the position of need 123, the fuel source 105, an exhaust port 127, and a check valve 128 for controlling the flow of fuel through the exhaust port 127. The fuel injector 120 is shown installed within a wall 101 of an exhaust passage.

The check valve 128 can be set just below the pressure of the fuel source 105, whereby there is a continuous fuel flow through the valve 127 and the internal passages 126 when the needle valve 123 is closed. This fuel is returned to a reservoir for the fuel source 105. When the needle valve 123 is open, the pressure drops and the flow is primarily out the opening created by needle valve 123.

While the engine 9 is preferably a compression ignition diesel engine, the various concepts of the inventor are applicable to power generation systems with lean-burn gasoline engines or any other type of engine that produces an oxygen rich, NOx-containing exhaust. For purposes of the present disclosure, NOx consists of NO and $NO_2$.

The power generation system can have any suitable types of transmission. A transmission can be a conventional transmission such as a counter-shaft type mechanical transmission, but is preferably a CVT. A CVT can provide a much larger selection of operating points than a conventional transmission and generally also provides a broader range of torque multipliers. The range of available operating points can be used to control the exhaust conditions, such as the oxygen flow rate and the exhaust hydrocarbon content. A given power demand can be met by a range of torque multiplier-engine speed combinations. A point in this range that gives acceptable engine performance while best meeting a control objective, such as minimum oxygen flow rate, can be selected.

In general, a CVT will also avoid or minimize interruptions in power transmission during shifting. Examples of CVT systems include hydrostatic transmissions; rolling contact traction drives; overrunning clutch designs; electrics; multi-speed gear boxes with slipping clutches; and V-belt traction drives. A CVT may involve power splitting and may also include a multi-step transmission.

A preferred CVT provides a wide range of torque multiplication ratios, reduces the need for shifting in comparison to a conventional transmission, and subjects the CVT to only a fraction of the peak torque levels produced by the engine. This can be achieved using a step-down gear set to reduce the torque passing through the CVT. Torque from the CVT passes through a step-up gear set that restores the torque. The CVT is further protected by splitting the torque from the engine, and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

A fuel reformer is a device that converts heavier fuels into lighter compounds without fully combusting the fuel. A fuel reformer can be a catalytic reformer or a plasma reformer. Preferably, the reformer 12 is a partial oxidation catalytic reformer comprising a steam reforming catalyst. Examples of reformer catalysts include precious metals, such as Pt, Pd, or Ru, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 450° C. The reformer is generally operative at temperatures from about 450 to about 1100° C.

The LNT 11 can comprise any suitable NOx-adsorbing material. Examples of NOx adsorbing materials include oxides, carbonates, and hydroxides of alkaline earth metals such as Mg, Ca, Sr, and Ba or alkali metals such as K or Cs. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide. The absorbent is typically combined with a binder and either formed into a self-supporting structure or applied as a coating over an inert substrate.

The LNT 11 also comprises a catalyst for the reduction of NOx in a reducing environment. The catalyst can be, for example, one or more transition metals, such as Au, Ag, and Cu, group VIII metals, such as Pt, Rh, Pd, Ru, Ni, and Co, Cr, or Mo. A typical catalyst includes Pt and Rh. Precious metal catalysts also facilitate the adsorbent function of alkaline earth oxide absorbers.

Adsorbents and catalysts according to the present invention are generally adapted for use in vehicle exhaust systems. Vehicle exhaust systems create restriction on weight, dimensions, and durability. For example, a NOx adsorbent bed for a vehicle exhaust systems must be reasonably resistant to degradation under the vibrations encountered during vehicle operation.

The ammonia-SCR catalyst 14 is a catalyst effective to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Preferably, the ammonia-SCR catalyst 14 is designed to tolerate temperatures required to desulfate the LNT 11.

Although not illustrated in any of the figures, a clean-up catalyst can be placed downstream of the other aftertreatment device. A clean-up catalyst is preferably functional to oxidize unburned hydrocarbons from the engine 9, unused reductants, and any $H_2S$ released from the NOx absorber-catalyst 11 and not oxidized by the ammonia-SCR catalyst 14. Any suitable oxidation catalyst can be used. To allow the clean-up catalyst to function under rich conditions, the catalyst may include an oxygen-storing component, such as ceria. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A power generation system, comprising:
   a diesel engine, an exhaust manifold, a turbocharger, and an exhaust line configured whereby the engine is operational to produce exhaust that is released into the exhaust manifold, passes through the turbocharger, and then into the exhaust line;
   a first fuel injector configured to inject fuel into the exhaust manifold upstream of the turbocharger;
   a fuel reformer and a LNT configured within the exhaust line, in that order, the LNT being adapted to adsorb and store NOx under lean exhaust conditions and to reduce the stored NOx and regenerate under rich exhaust conditions; and
   a controller adapted to actuate the first fuel injector in order to initiate regeneration of the LNT to remove accumulated NOx;
   further comprising a second fuel injector configured to inject fuel into the exhaust line downstream of the turbocharger but upstream of the fuel reformer;
   wherein the controller is configured to time the fuel injections from the first and second fuel injectors whereby the majority of the fuel injected with the first fuel injector during the LNT regeneration mixes within the exhaust line with fuel injected with the second fuel injector to form a rich mixture within the fuel reformer, whereby the fuel reformer forms reformate that regenerates the LNT.

2. A power generation system, comprising:
   a diesel engine, an exhaust manifold, a turbocharger, and an exhaust line configured whereby the engine is operational to produce exhaust that is released into the exhaust manifold, passes through the turbocharger, and then into the exhaust line;
   a first fuel injector configured to inject fuel into the exhaust manifold upstream of the turbocharger;
   a fuel reformer and a LNT configured within the exhaust line, in that order, the LNT being adapted to adsorb and store NOx under lean exhaust conditions and to reduce the stored NOx and regenerate under rich exhaust conditions; and
   a controller adapted to actuate the first fuel injector in order to initiate regeneration of the LNT to remove accumulated NOx;
   further comprising a second fuel injector configured to inject fuel into the exhaust line downstream of the turbocharger but upstream of the fuel reformer;
   wherein the controller is configured to time the fuel injections from the first and second fuel injectors whereby combustion of the fuel injected with the first fuel injector substantially reduces the oxygen content of the exhaust that mixes with the fuel injected by the second fuel injector, which forms a rich mixture from which the reformer produces reformate that regenerates the LNT.

3. A power generation system, comprising:
   a diesel engine, an exhaust manifold, a turbocharger, and an exhaust line configured whereby the engine is operational to produce exhaust that is released into the exhaust manifold, passes through the turbocharger, and then into the exhaust line;
   a first fuel injector configured to inject fuel into the exhaust manifold upstream of the turbocharger;
   a fuel reformer and a LNT configured within the exhaust line, in that order, the LNT being adapted to adsorb and store NOx under lean exhaust conditions and to reduce the stored NOx and regenerate under rich exhaust conditions; and
   a controller adapted to actuate the first fuel injector in order to initiate regeneration of the LNT to remove accumulated NOx;
   further comprising a second fuel injector configured to inject fuel into the exhaust line downstream of the turbocharger but upstream of the fuel reformer;
   wherein:
   the controller is configured to implement a process of regenerating the LNT that comprises a period of heating the fuel reformer under lean exhaust conditions followed by a period of producing reformate under rich exhaust conditions; and
   the controller is configured to time fuel injections from the first and second fuel injectors whereby immediately following the transition from lean to rich, the majority of fuel supplied to the fuel reformer comes from the second fuel injector, but as the rich period progresses, the proportion of fuel supplied to the fuel reformer by the first fuel injector increases.

* * * * *